(12) United States Patent
Zaydman et al.

(10) Patent No.: US 8,321,435 B2
(45) Date of Patent: Nov. 27, 2012

(54) QUICK FIND FOR DATA FIELDS

(75) Inventors: Oleg Zaydman, San Jose, CA (US);
Christopher Crim, San Jose, CA (US);
Clay Maeckel, San Jose, CA (US); Galt Johnson, Mountain View, CA (US);
Stephen Iremonger, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 492 days.

(21) Appl. No.: 12/540,083

(22) Filed: Aug. 12, 2009

(65) Prior Publication Data

US 2011/0040745 A1 Feb. 17, 2011

(51) Int. Cl.
G06F 7/00 (2006.01)
G06F 17/30 (2006.01)

(52) U.S. Cl. ........................................ 707/755; 715/969
(58) Field of Classification Search .................. None
See application file for complete search history.

(56) References Cited

U.S. PATENT DOCUMENTS

| | | | | |
|---|---|---|---|---|
| 5,710,915 A | * | 1/1998 | McElhiney | 1/1 |
| 5,781,773 A | * | 7/1998 | Vanderpool et al. | 707/693 |
| 6,085,188 A | * | 7/2000 | Bachmann et al. | 1/1 |
| 6,233,583 B1 | * | 5/2001 | Hoth | 707/752 |
| 6,640,221 B1 | * | 10/2003 | Levine et al. | 1/1 |
| 6,643,640 B1 | * | 11/2003 | Getchius et al. | 707/719 |
| 7,603,366 B1 | * | 10/2009 | Gritsay et al. | 1/1 |
| 7,788,134 B1 | * | 8/2010 | Manber et al. | 705/26.1 |
| 2002/0021889 A1 | * | 2/2002 | Hayakawa et al. | 386/68 |
| 2002/0038306 A1 | * | 3/2002 | Griffin et al. | 707/101 |
| 2002/0059297 A1 | * | 5/2002 | Schirmer et al. | 707/104.1 |
| 2002/0133488 A1 | * | 9/2002 | Bellis et al. | 707/6 |
| 2002/0161757 A1 | * | 10/2002 | Mock et al. | 707/5 |
| 2002/0184202 A1 | * | 12/2002 | Hara et al. | 707/3 |
| 2004/0001104 A1 | * | 1/2004 | Sommerer et al. | 345/811 |
| 2004/0074365 A1 | * | 4/2004 | Nilsen et al. | 83/745 |
| 2004/0088283 A1 | * | 5/2004 | Lissar et al. | 707/3 |
| 2005/0091287 A1 | * | 4/2005 | Sedlar | 707/200 |
| 2005/0102314 A1 | * | 5/2005 | Howard et al. | 707/102 |
| 2005/0182761 A1 | * | 8/2005 | Kato | 707/3 |
| 2006/0047644 A1 | * | 3/2006 | Bocking et al. | 707/4 |
| 2006/0058958 A1 | * | 3/2006 | Galbreath et al. | 701/214 |
| 2006/0074881 A1 | * | 4/2006 | Vembu et al. | 707/3 |
| 2006/0101005 A1 | * | 5/2006 | Yang et al. | 707/3 |

(Continued)

OTHER PUBLICATIONS

Towards discovery of event correlation rules, Burns et al, IEEE 2001.*

(Continued)

*Primary Examiner* — Pierre Vital
*Assistant Examiner* — Augustine Obisesan
(74) *Attorney, Agent, or Firm* — Fish & Richardson P.C.

(57) ABSTRACT

Methods, program products, and systems for automatically searching data in multiple data fields are described. A user can view data retrieved from a database and formatted based on a layout. While viewing the data, the user can perform a search using one or more search terms. A system can automatically examine the database and identify on which tables and on which data fields of the tables to perform the search. The system can identify searchable tables and data fields by analyzing the database schema as well as characteristics of the tables and data fields.

27 Claims, 11 Drawing Sheets

U.S. PATENT DOCUMENTS

| | | | |
|---|---|---|---|
| 2006/0149712 A1* | 7/2006 | Kindsvogel et al. | 707/3 |
| 2006/0195437 A1* | 8/2006 | Dietel | 707/4 |
| 2006/0225029 A1* | 10/2006 | Flatow | 717/104 |
| 2007/0150163 A1* | 6/2007 | Austin | 701/102 |
| 2007/0192343 A1* | 8/2007 | Faerber et al. | 707/100 |
| 2007/0282834 A1* | 12/2007 | Jang | 707/6 |
| 2008/0021867 A1* | 1/2008 | Nomura et al. | 707/2 |
| 2008/0133523 A1* | 6/2008 | Norton et al. | 707/6 |
| 2008/0183747 A1* | 7/2008 | Mangipudi | 707/103 R |
| 2009/0106294 A1* | 4/2009 | Gutlapalli et al. | 707/102 |

OTHER PUBLICATIONS

Answering multiple questions on a topic from heterogeneous resources, katz et al, Proceeding of Thirteenth Text Retrieval Conference (TREC-13), 2004.*

Query multiple databases dynamically on the world wide web, Cardiff et al, IEEE 2000.*

Predicate re-writing for translating boolean query in a heterogenous information system, Chang et al, ACM Transaction of Information System, 7(1), pp. 1-39., 1999.*

* cited by examiner

QUICK FIND FOR DATA FIELDS

TECHNICAL FIELD

This disclosure relates generally to database applications.

BACKGROUND

In database application development environments that do not offer search-specific assistance for application developers, an application developer who tries to implement search functionality can be forced to limit the search functionality to a single term and a single field. Furthermore, the application developer may be forced to write complicated database query code (e.g., SQL code) to implement the search functionality. Every time a field is added or removed, the SQL code dedicated to searching may need to change. Some application developers create one global index of every table in the database and use that index for searching, but keeping such index up-to-date is difficult. Moreover, the application developer typically has to implement a special user interface to display search results.

SUMMARY

Methods, program products, and systems for automatically searching data in multiple data fields are described. A user can view data retrieved from a database and formatted based on a layout. While viewing the data, the user can perform a search using one or more search terms. A system can automatically examine the database and identify on which tables and on which data fields of the tables to perform the search. The system can automatically identify searchable tables and data fields by analyzing the database schema, relevant queries, as well as characteristics of the tables and data fields.

In some implementations, a system can identify one or more searchable data fields from a layout. The layout can correspond to a base table in a database. The system can identify a table related to the base table. The system can determine whether the related table is a searchable table based on a degree of relationship between the related table and the base table using static analysis or dynamic analysis. The system can automatically identify the searchable data fields from the base table and the related table. The system can receive a search request, which includes at least one search term. The system can perform a search in the identified searchable data fields using the search term.

The disclosed implementations achieve the following advantages, among others. A database tool can present a "one stop" search function for a user. The database tool can produce relevant search results even when the user does not know which table or column in a database can contain the search term. The user can view data and perform search in a single view window. An application programmer can designate a specific data field as searchable or non-searchable based on the nature of the data field (e.g., whether an index can be created the data field). Excluding an un-indexable field can improve search efficiency. Quick search features can bridge a gap between searching user-specified database fields and searching all fields, making search both fast and easy to configure.

The details of one or more implementations are set forth in the accompanying drawings and the description below. Other features, aspects, and advantages of quick find will become apparent from the description, the drawings, and the claims.

BRIEF DESCRIPTION OF THE DRAWINGS

Like reference symbols in the various drawings indicate like elements.

DETAILED DESCRIPTION

Quick Find Techniques Overview

Figure 1:
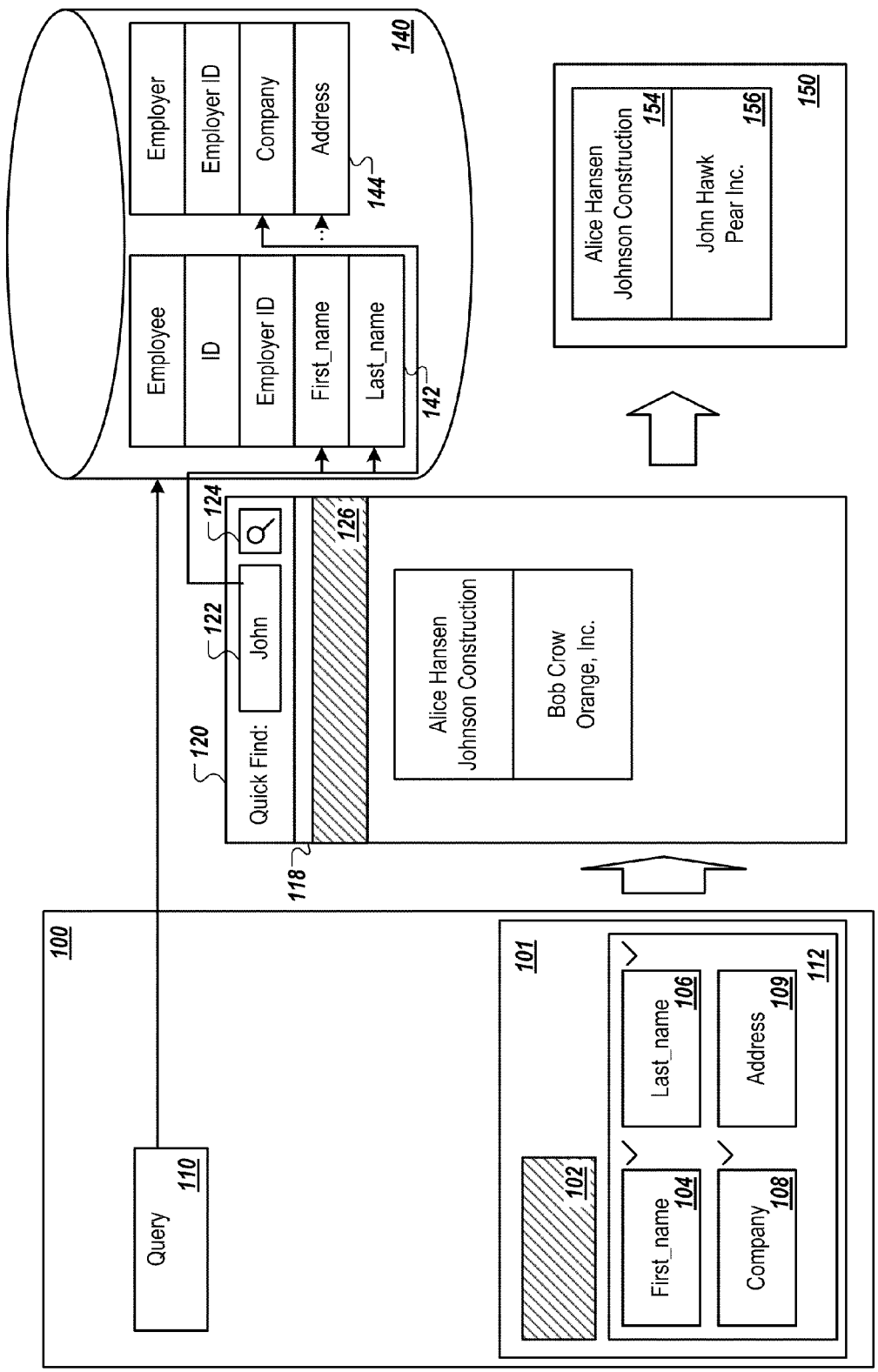
FIG. 1 illustrates an exemplary implementation of quick find for data fields.

FIG. 1 illustrates an exemplary implementation of quick find for data fields. For convenience, the exemplary implementations will be described with respect to a database reporting system that performs the techniques, and a user using database application program 100 running on the database reporting system.

Quick find features in an application development environment can allow application programmers build database applications that allow a user to search a database in a manner that appears similar to searching indexed content. The system does not require that the user should understand entities (e.g., tables and data fields) and relationships in the database. A user can run a database application program 100 to view or modify data of database 140. Query 110 of database application program 100 can retrieve two exemplary records of employees Alice and Bob from database tables 142 and 144. Database application program 100 can format the records of Alice and Bob using layout 101, and can display the records on formatted view 118. Formatted view 118 (e.g., a browse view, a list view, or a table view) can be a presentation of formatted data using layout 101. The user can submit to database application program 100 a quick find search request, using a search term "john." At time layout 101 is constructed, database application program 100 can analyze tables 142, 144, and other database tables to determine on which tables and which data fields to perform the search. As an example, database application program 100 determines that the fields First_name, Last_name, and Company in tables 142 and 144 are searchable. Database application program 100 can search these data fields and retrieve records for employee Alice, whose employer is "Johnson Construction" and employee John, whose first name matches the search term. The retrieved records for Alice and John can be displayed in a new formatted view. The search result can exclude some records from the original displayed data ("Bob") as well as introduce new data ("John"). The quick find features will be discussed below in further details.

Generally, a database reporting system can permit the user to view formatted data through reporting tools instead of directly accessing raw data stored in a database. The reporting system can include various components, such as a query engine (for retrieving data from the database), a layout editor (for creating and editing layout 101 for formatting data), and a formatting engine (for formatting and displaying the data using layout 101). A user can create database application program 100, which can run on the database reporting system in a way similar to an operating system running an executable program. Running database application program 100 can include querying database 140 and displaying results in formatted view 120 on a display screen.

Database application program 100 can include query 110, layout 101, and various state information (e.g., whether something is searchable by quick find or not). Query 110 can include one or more query statements for querying one or more databases 140. Layout 101 can include an arrangement of data fields, objects, pictures, and layout parts that represents ways information is organized and presented when a user browses, previews, or prints data records. The user can design different layouts for entering data, printing reports, displaying Web pages, etc. Layout 101 can contain various parts, e.g., header section 102, body section 112, etc.

Body section 112 can contain three data fields 104, 106, and 108, each corresponding to a field in database tables 142 and 144 (e.g., data columns "First_name," "Last_name," and "Company"). Each data field 104, 106, and 108 can be designated a searchable or unsearchable in quick find, either automatically or manually. Data fields designated as searchable can be marked on a user interface to distinguish from unsearchable data fields, either automatically or manually. In the example of FIG. 1, each of data fields 104, 106, and 108 has a corresponding checkmark, indicating that the data field is searchable (e.g., eligible for quick find). If a data field is eligible for quick find, the data field can be included as a search target when a user makes a quick find request. Data fields 104, 106, and 108 can be designated as quick find eligible through various means, e.g., automatically determined by the system, through a user interface (UI), or using a script. In this example, data field 109 is not designated as quick find eligible data field. One exemplary reason can be that data field 109 lacks an index. However, user can change the setting and make data fields 109 a searchable data field.

The database reporting system can open a connection between database application program 100 and database 140, and retrieve data using original database query 110. Query 110 can include various selection criteria. For example, query 110 can specify that employees whose ID number are smaller than 10 are selected. In some implementations that will be described in further details below, a "quick find" search can use a query different from original query 110, removing the selection criteria. Query 110 can also include query statements that include a "join." In some implementations (e.g., when Structured Query Language (SQL) is used), a "join" keyword can be used to query data from two or more tables (e.g., employee table 142 and employer table 144), based on a relationship between certain columns (e.g., Employer_ID) in these tables. In the example shown, query 110 retrieved two data records, Alice and Bob, based on the selection criteria.

The database reporting system can use formatted view 118 to display formatted data from database 140. Formatted view 118 can include toolbar area 120, header 126, and body 128. Toolbar area 120 can include a quick find control that allows a user to issue a quick find command to the system. The quick find control can include a label (e.g., "Quick Find:"), text area 122, and quick find button 124. A user can enter one or more search terms (e.g., "john") in text area 122. A search term can include a lexical unit that contains a single word, a number, or a composition of alphanumerical values. A search term can also include multiple words, numbers, or compositions connected by various connectors (e.g., dash, underline, slash, or other displayable and non-displayable characters). In some implementations, a search term can include an expression, an operator, or a variable that can be evaluated into a value or translated into a formula.

When a user enters one or more search terms in text area 122 in the quick find control of toolbar 120 and clicks quick find button 124, the database reporting system can perform a search on searchable data fields in multiple database tables. The system can automatically determine which field in which table is searchable based on various criteria, which will be described in further details below. For example, searchable data fields can include data fields 104, 106, and 108, corresponding to table columns "First_name" and "Last_name" in database table 142 ("Employee") and table column "Company" in database table 144 ("Employer"). The system can also allow a user to designate a field as searchable manually. For example, the user can designate a data field "Address" as a searchable data field by adding the field directly in formatted view 118, even though data field "Address" is not automatically designated as searchable in layout 101.

The quick find feature can allow the system to search for a term in tables and data fields beyond tables and rows displayed in formatted view 118. When a user requests a quick find using search term "john," the database reporting system can formulate one or more quick find queries. The quick find queries can retrieve data record 154 because searchable data field "Company" contains string "Johnson." The database reporting system can retrieve data record 156 because searchable data field "First_name" contains string "John." In some implementations, the quick find query can exclude the selection criteria of the current query. For example, a search for "blue" followed by a search for "dog" can return information about any dog, not just blue dogs. Therefore, the quick find feature can return all employees of company "Johnson Construction" and every employee whose first or last name contains the term "john" regardless whether the employee satisfies the selection criteria (e.g., regardless of whether employee ID is less than 10) specified in original query 110.

Once the database reporting system retrieves data records 154 and 156 from database 140 using the quick find queries, the database reporting system can format data records 154, and 156 using layout 101 to produce a new formatted view that can contain body 150. The new formatted view can contain toolbar, header, and other sections that are identical to those in formatted view 118. The data fields displayed (e.g., employee names, company, etc.) can also be identical to those in formatted view 118. However, the number of data records in body 150 is not necessarily smaller than the number of data records in body 128, because the new queries can exclude one or more selection criteria specified in query 110. The exclusion can broaden the query, thus retrieving data records not previously retrieved.

Figure 2:
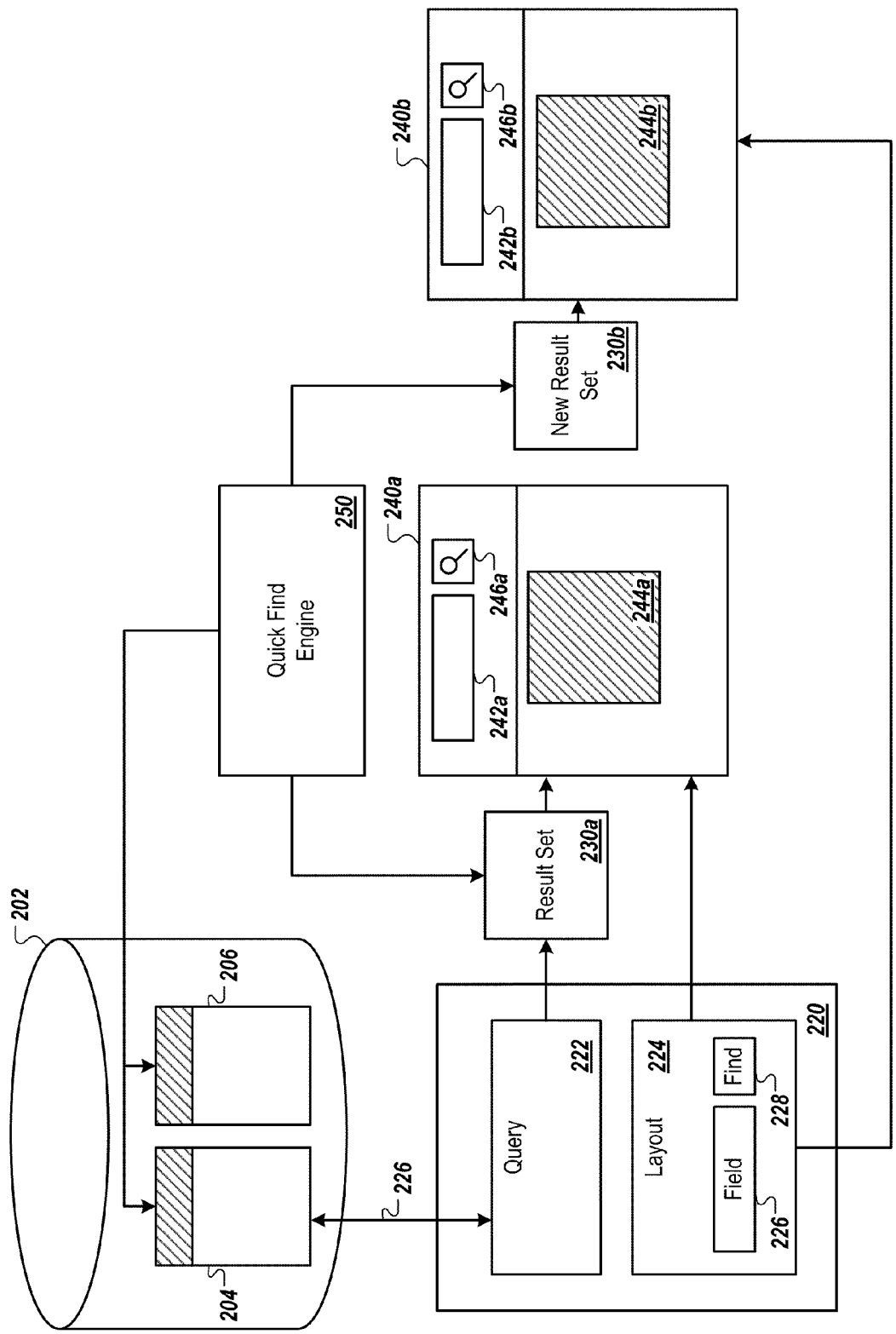
FIG. 2 is an overview of some exemplary implementations of quick find techniques.

FIG. 2 is an overview of some exemplary implementations of quick find techniques. A database reporting system can include quick find engine 250. Quick find engine 250 can include multiple components that are part of, or work in conjunction with, other modules (e.g., query engine, layout editor, etc.) of the database reporting system to perform quick find functions. Quick find engine 250 can create one or more quick find queries. Some exemplary elements of the search queries are the searchable tables, the searchable data fields, and the search terms. Quick find engine 250 can execute the quick find queries and retrieve a new result set 230b, which can be formatted and displayed in formatted view 240b. Details of the exemplary implementations will be described below.

The database reporting system can run database application program 220 to retrieve result set 230a and format result set 230a into formatted view 240a using layout 224. Database application program 220 can include query 222, which can retrieve data records from database table 204 through one or more database connection 216. A "data record" can be used to refer to a collection of data fields (including data fields 226 and 228) in one or more tables. Each data record can contain data about a single activity, individual, subject, or transaction. Data field 226 can be a unit of data in a record. A user can define data field 226 to hold a specific, discrete category of data, such as last name, employer, address, etc. Data field 226 can also be a result of a calculation. Data field 226 can have a type, e.g., text, number, data, time, timestamp, container, calculation, and summary field. Data field 226 can be associated with an object on layout 224 that can display and edit the properties of data field 226, such as an edit box, a set of checkboxes, or a pop-up menu. Data field 226 in layout 224 can correspond to a column of data in database tables 204 and 206. For example, a user can specify that data field 226 holds last names and corresponds to a column "Last_name" in table 204 (e.g., "Employee" table).

Layout 224 can have a base table 204 and a related table 206. Base table 204 can be a default table for layout 224. A base table can be any table in a database. By designating one particular table as a base table, editing layout 224 can be simplified. For example, when a user specifies a column name for data field 226 without specifying which table the column is from, the system can use the base table name as a default table name in building a query. Related table 206 can be any database table that is related to base table 204 by one or more data columns.

Based on layout 224 and either schema of database 202 or query 222, quick find engine 250 can determine which tables are searchable by quick find by applying static analysis and dynamic analysis of tables 204 and 206. Quick find engine 250 can also determine which data field is searchable using quick find feature. In some implementations, the system can automatically limit the quick find to a subset of all data fields in database 202. The system can implement various limitations to determine which field is searchable in quick find.

Formatted view 240a can include a toolbar and body 244a. The toolbar can include a quick find control, e.g., text area 242a that allows a user to enter search terms for quick find, and quick find button 246a. Quick find button 246a can be configurable to display various text strings (e.g., string "Go") or icons (e.g., an icon that has an appearance of a magnifying class). A user can submit a quick find request to the system by entering search terms in text area 242a and clicking quick find button 246a.

A quick find request can invoke quick find engine 250. Quick find engine 250 can create a quick find query to access base table 204 and related database tables 206. In some implementations, the quick find query can be based on the identified searchable tables, searchable fields, and search term. The quick find query can be unrelated to the search criteria in query 222.

The database reporting system can use the quick find queries to retrieve new result set 230b. The database reporting system can format new result set 230b using layout 224 to generate new formatted view 240b. New formatted view 240b can include a status bar and body 244b. The status bar can include text area 242b and quick find button 246b, which allows a user to perform another quick find.

Exemplary Quick Find Processes

Figure 3A:
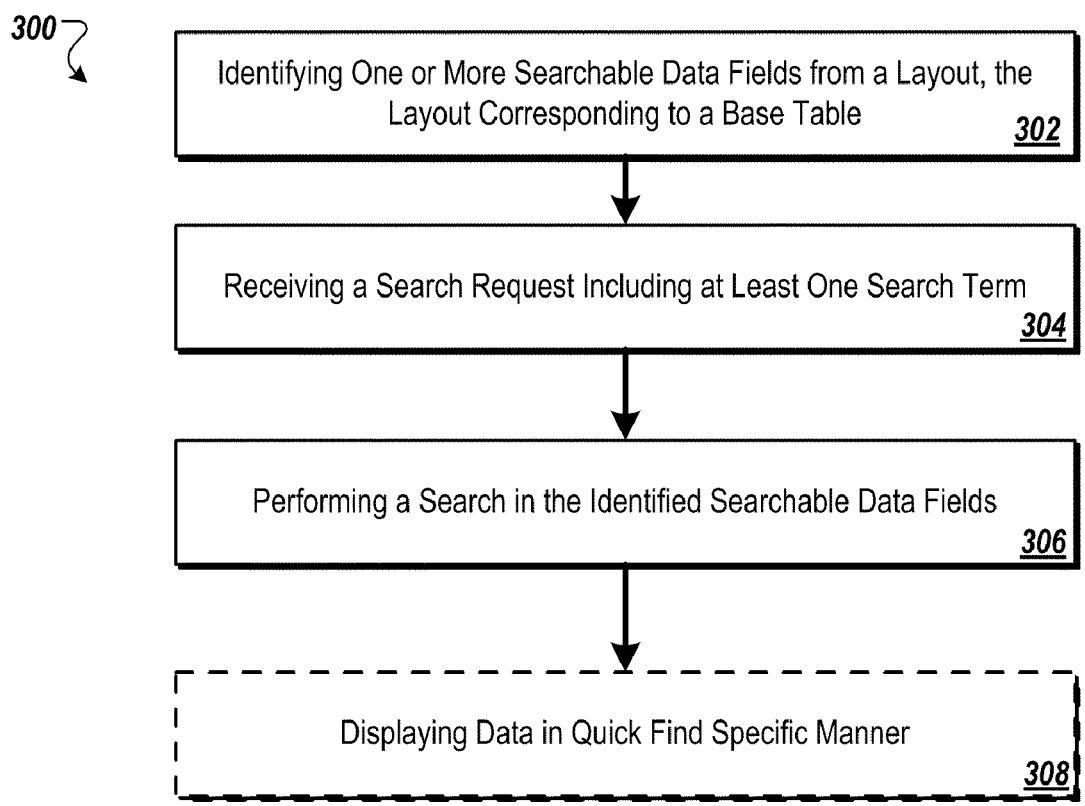
FIGS. 3A and 3B are flowcharts illustrating exemplary processes of quick find.
Figure 3B:
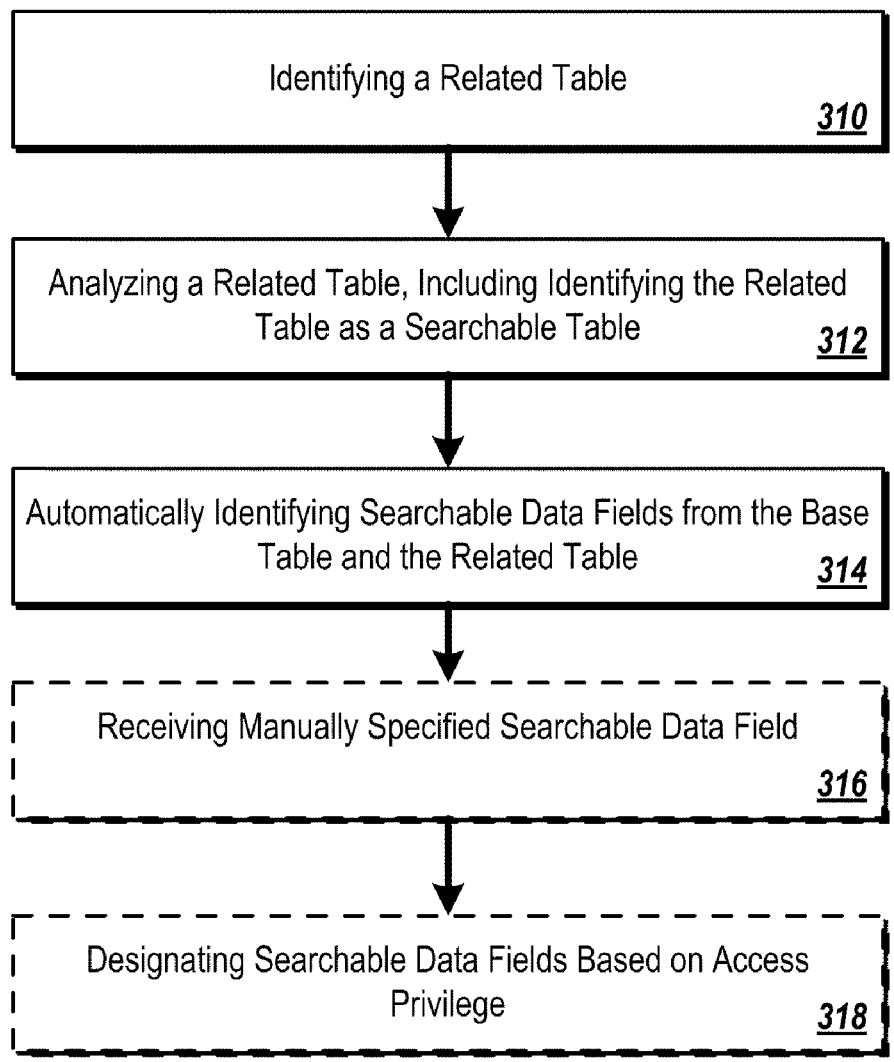

FIGS. 3A and 3B are flowcharts illustrating exemplary processes of quick find. For convenience, the exemplary implementations will be described with respect to a database reporting system that performs the techniques, and a user using a database application program.

FIG. 3A is a high-level flow chart illustrating an exemplary process 300 of quick find. The process of FIG. 3A can apply when a layout is created, opened, or modified. The database reporting system can identify (302) one or more searchable data fields from a layout. The layout can correspond to a base table in a database.

The database reporting system can receive (304) a quick find search request. The quick find request can include one or more search terms. The search request can be received from a variety of interfaces. For example, the system can receive the search request through a quick find control on a formatted view. The system can alternatively receive the search request through a script, a Web-based interface, or an application-programming interface (API).

The database reporting system can perform (306) a search in the identified data fields using the search term. Performing the search can include generating one or more quick find queries to retrieve data from database. The quick find queries can be directed at the searchable tables and searchable data fields. The quick find queries can contain selection criteria that are based on the search terms.

The system can optionally display (308) data in a quick find specific manner to indicate that the system is engaging in a quick find or presenting a result from a quick find. The system can use a specific appearance (e.g., dimming a background of a display window of the formatted view) to indicate that the system is performing a quick search. In addition, when the system detects that a user is about to perform quick find (e.g., when a user starts typing in text area 122), or when the quick find is in progress, non-searchable data fields can be dimmed such that a user is not surprised why a particular field is not searched. The result of quick find can be formatted using quick find specific formatting rules, e.g., in addition to user defined rules in a layout. For example, each search term that appears in the result can have a specific format (e.g., a highlight). In some implementations, each search term appearing in the result can be highlighted in a distinct color.

FIG. 3B is a flowchart illustrating an exemplary process 302 of identifying searchable data fields from a layout. Searchable data fields can exist in both the base table and tables related to the base table. By automatically identifying searchable data fields in related tables, the system can present relevant search results even when a user possesses little or no knowledge about the structure and relationship within a database.

The database reporting system can identify (310) a related table. Identifying a related table can include analyzing a database schema that defines relationships between tables, or a query statement than relates two tables. In database schema, a "relationship" can capture how two or more tables are related to one another. Tables can relate to each other, for example, using a foreign key (e.g., table A can contain a column of identifiers that uniquely identify rows of table B). Identifying a related table can also include analyzing the queries that retrieve data. Tables can relate to each other by a join (e.g., when a SELECT statement has a selection criterion that requires a value in a column of table A match a value in a column of table B). The join can be an equality join.

The database reporting system can analyze (312) a related table to determine whether the related table is a searchable table. Analyzing the related table can include determining whether the related table is searchable by the quick find feature based on a how closely the related table relates to the base table. The analysis can include static analysis and dynamic analysis.

By performing static analysis, quick find engine 250 can start from base table 204 and locate, based on schema and query 222, related table 206 that is suitable for quick find. The system can locate a related table based on a number of joins between the related table and the base table, as well as a type of the joins. For example, in static analysis, the system can locate related table 206 that is no more than one join away from base table 204, in which the type of the join is equality. The system can further select a related table based on a direction of the join. For example, the system can select related table 206 that is on a "one" side of a one to one or a one to many relationship with base table 204.

By performing dynamic analysis, quick find engine 250 can start from base table 204 and locate related table 206 that is suitable for quick find based on content, rather than structure, of tables 204 and 206. In dynamic analysis, the system can locate related table 206 (or related data field in a related table) based on the characteristics of table 206 (e.g., table size) or feature of the data field (e.g., how effective the field can be if the field is set as a selection criterion). The analysis is dynamic because the characteristics of the table or feature of the field can be determined by the data in the table, and can change as new rows are inserted into the table, existing rows are deleted from the table, the rows change.

Dynamic information that can be used in determining whether a data field is searchable can include, for example, field selectivity. Field selectivity can relate to how useful the field is in a search. For example, a table for songs can include a track number and an artist name for each song. The track number can have a low selectivity (because virtually any song can be on track "1" of an album), whereas the artist name can have a high selectivity. The artist name can have a high selectivity because once a user selects an artist name "Michael Johnson," the number of matching songs can be significantly reduced compared to songs with unrestricted artist names.

In some implementations, quick find engine 250 can loop over all the fields on layout 224, and automatically build joins between the field's table (e.g., table 206) and base layout table 204. If there exists a table related to the base layout table, but no fields from that table are present on the layout, quick find engine 250 can ignore that table. In these implementations, there is no need for designating a table as a searchable or not.

The database reporting system can automatically identify (314) searchable data fields from the base table and the related tables. Identifying searchable data fields can include automatically determining whether quick find can be performed on a particular data field based on various conditions.

The database reporting system can optionally receive (316) manually specified searchable data field. The system can present a user interface for manually designating a data field to be searchable or unsearchable. On the user interface, a user can overwrite the automatic decision of the system. In some implementations, the system can provide a badge for each automatically identified searchable data fields on the user interface. If the user designates another data field (e.g., a data field the system did not determine to be searchable), the system can provide a second badge for the user designated data field. The badges can be configured to indicate various search speed on the search fields.

The user interface can allow the user to overwrite the automatic settings of the fields in groups. For example, the user can mark the entire layout searchable or unsearchable, mark a particular group of fields searchable or unsearchable, or mark an individual field as searchable or unsearchable. The user can overwrite the settings either in layout 224 or in formatted view 240a.

The database reporting system can optionally identify (318) searchable data fields using user roles and various access privileges. In some implementations, the system can designate one or more groups of searchable fields, each group corresponding to a layout that is accessible to a user who has specific access privileges. The system can determine that a data field is searchable based on a group to which the data field belongs and a current access privilege. A user having a particular level of privilege can perform quick find on certain data fields. Levels of privileges can be defined for the user, or for a role (e.g., analyst or manager). A user can be assigned to one or more roles. In some implementations, when the user assumes a specific role, a specific set of fields can be made searchable. In some implementations, when the user assumes a specific role, the user can change the search designation for the specific set of fields.

In addition, multiple data fields can be grouped together and given a label. A user can select various groups using a pull-down menu containing labels, and designate an entire group of data fields as searchable or non-searchable.

Figure 3C:
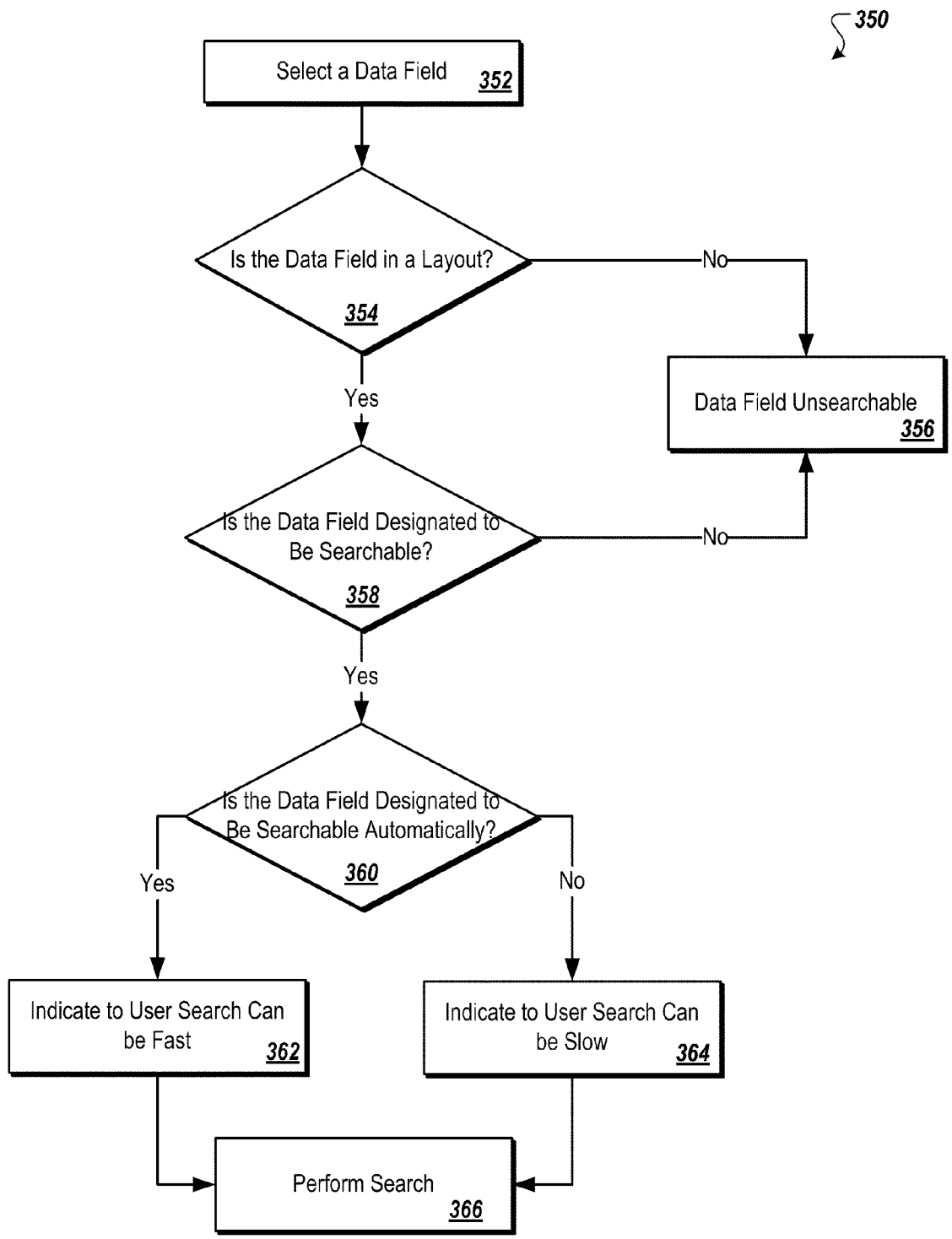
FIG. 3C is a flowchart illustrating an exemplary process for automatically identifying searchable tables and data fields.

FIG. 3C is a flowchart illustrating an exemplary process for automatically identifying searchable data fields. Once the system knows which tables are searchable tables, the system can analyze the tables and determine which fields within the tables are searchable. The system can apply the process to multiple data fields in a loop.

The database reporting system can select (352) a data field from a base table or a related table. Selecting a data field can occur during layout editing (e.g., when a user edits a layout), when a new data field is added to the layout. Selecting a data field can also occur on a formatted view, when a user dynamically adds a data field to the formatted view. In such instances, the system is not required to check the layout.

The database reporting system can examine (354) whether the data field is in a layout, or whether the data field is added in a formatted view. If the data field is not on a layout, the data field can be designated as not searchable (356). The database reporting system can move on to a next data field.

Not all data fields in the base table are necessarily searchable. If the quick find feature searches a data field, the result needs to be put somewhere (e.g., displayed). In some implementations, the system can limit the searchable data fields to data fields present on layout 224. Under this limitation, data fields that are naturally visible can be searched. Therefore, data fields present on layout 224 can be searchable because they are naturally visible on formatted view 240a.

In various implementations, not all data fields in a database need to be retrieved by a query. Similarly, not all data fields retrieved by the query need to be included in layout. For example, when table 142 is the base table of a layout of database application program 100, two fields "First_name" and "Last_name" are present in the layout. Two fields "ID" and "Employer_ID" are not. Therefore, fields "First_name" and "Last_name" can be searchable. A table can be a base table of many layouts. A data field in the table can be a searchable data field in one layout and a non-searchable data field in another layout.

An exception to this limitation is that a user can add data fields directly on formatted view 240a (e.g., bypassing layout 224). The added data fields can be searchable, even though they are not present on layout 224, because the added data fields can be naturally visible. When database application program 220 allows a user to change formatted view 240a dynamically, the user can add or remove displayed data fields after result set 230a has been formatted. Post-formatting editing therefore can make more or fewer data fields searchable.

If the data field is on a layout, the database reporting system can examine (358) whether the data field is has a searchable type. In some implementations, the system can limit the searchable data fields to data fields having a searchable data type. A searchable data type can include number (integer, float, etc.), string, date, etc. If data field 226 has some data types (e.g., audio, image, calculation), data field 226 can be excluded from quick find search. An exception to this limitation is that a user can manually designate some data field to be searchable. For example, a user can designate a calculation field to be searchable (e.g., by checking a quick find check box on a layout editor, or setting a quick find property on formatted view 240a). As long as the type of the added field is a searchable type, the data field is automatically a candidate to become a searchable field.

If the data field does not have a searchable data type, the data field is unsearchable, unless a user manually sets the field as searchable. The database reporting system can move on to a next data field.

If the data field is not designated as searchable, the database reporting system further determines (360) whether a quick find on the data field can be fast.

If a quick find on the data field can be fast, the database reporting system can indicate (362) to a user that a search on the field can be fast. The indication can be made by a badge on a user interface.

Speed of a search can be determined by many factors. One example factor is whether a field is indexed. An index on data column can speed up a search on the data column. In some implementations, the system can determine whether an index on a searchable data field exists (e.g., by using a "SHOW INDEXES" statement in SQL implementations), and create an index one the searchable data field if necessary (e.g., by using a "CREATE INDEX" statement). In various implementations, creating the index can occur when a data field is designated as a searchable (e.g., when a layout is being edited, or when a new data field is directly added to a formatted view). Creating the index can alternatively occur at search time in "lazy" implementations. In lazy implementations, the first quick find on a field can be slow (because an index is created before the actual search takes place), but the subsequent quick searches on the same field can be fast. Searching can be fast when the data field is in a simple relationship (e.g., a one-on-one relationship).

Searching can also be fast when the system has sufficient information about a data field. In such cases, the system need not make complicated decisions or perform time consuming data preparations (e.g., whether to create an index on the field). In a UI, the data field on which the system can search fast can be associated with a "fast" badge. A badge can be designated as "fast" or "slow" based on a color, shape, or label of the badge. In some implementations, a badge can use a color scheme to indicate the estimated speed. For example, a "fast" badge associated fast searches can have a green color.

If, by comparison, the quick find on the data field may be slow, the database reporting system indicate (364) to the user as such. Indicating fields on which search can be slow can make it easier for an application developer to see which fields may slow down quick find, and exclude these fields unless there are business reasons not to.

Searching may be slow when the data field is in a complex relationship (e.g., a many-to-many relationship) where large amount of data can fall within the scope of the search. Although the system does not need to automatically designate a table related to the base table in a many-to-many relationship as searchable, a user can make such a designation. In some implementations, the following categories of data fields can be designated as "slow" fields:

Fields that do not have an index and either do not support index generation or disallow index generation;
Calculation fields that do not store calculation results;
Related fields.

In a UI, the data field on which the search may be slow can be associated with a "slow" badge. For example, a "slow" badge associated slow search data fields can have a red color. The system can perform (366) the search on both the fast and slow search data fields.

Exemplary Quick Find Engine

Figure 4A:
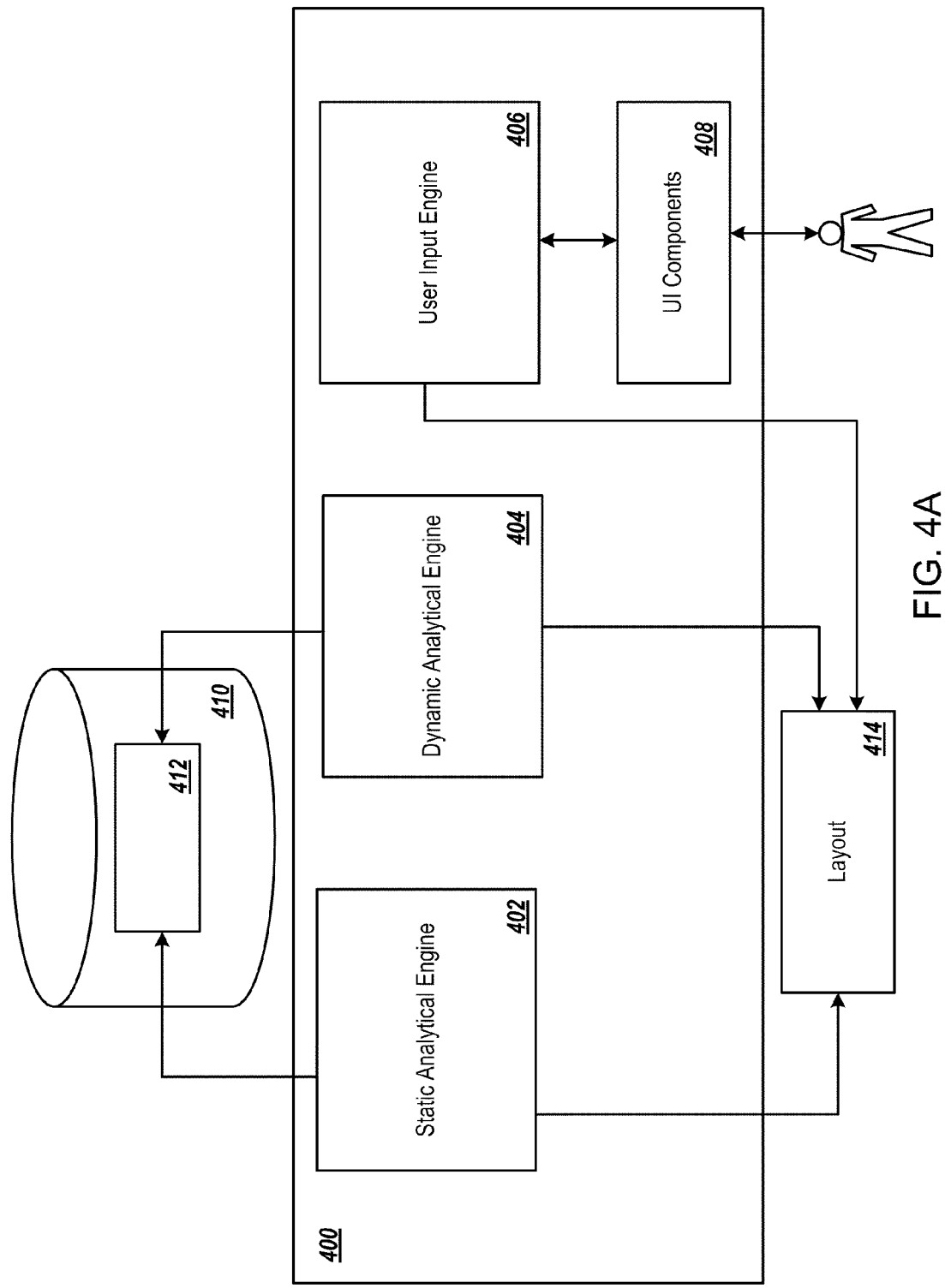
FIGS. 4A and 4B are block diagrams illustrating components of an exemplary quick find engine.
Figure 4B:
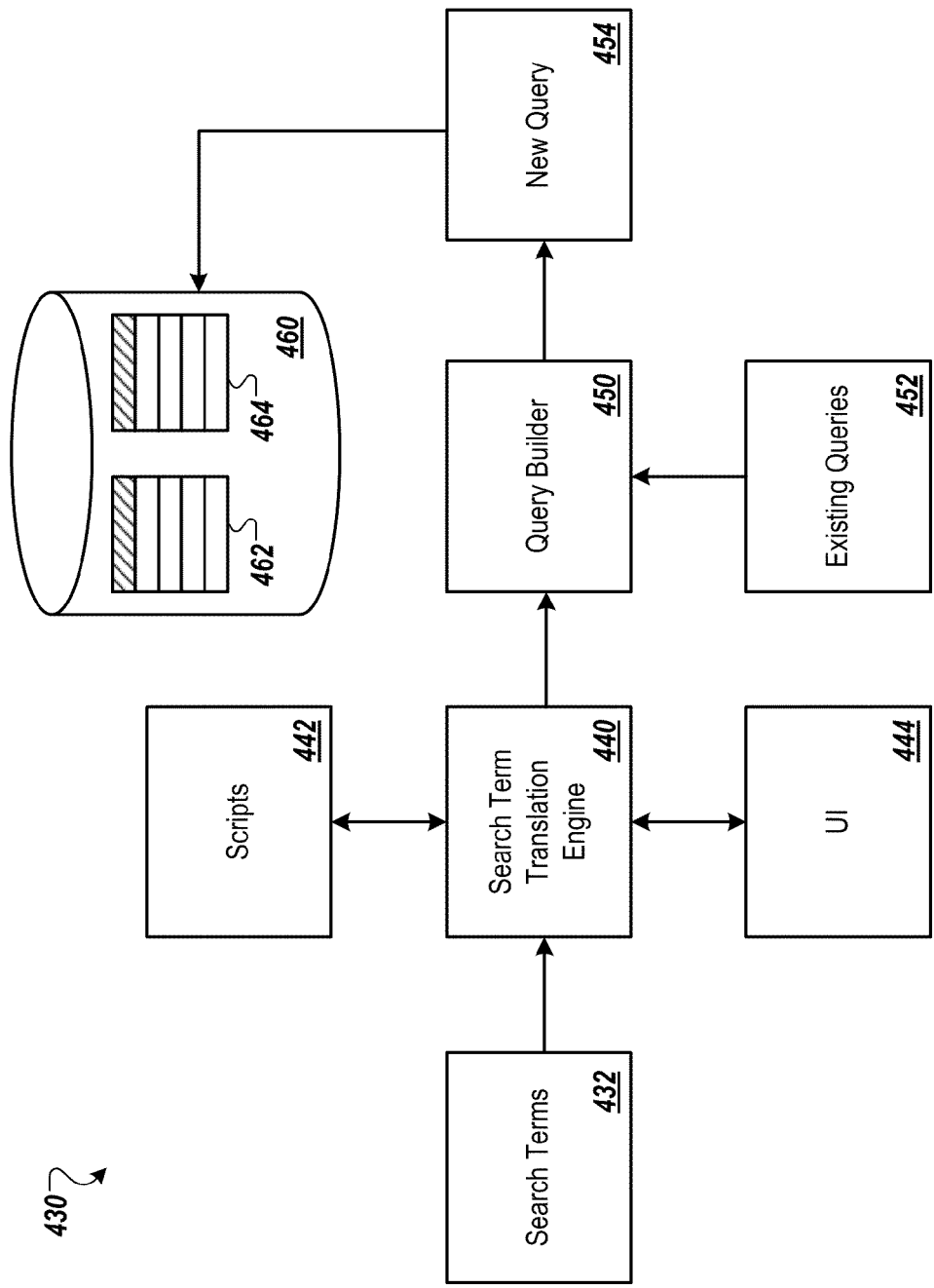

FIGS. 4A and 4B are block diagrams illustrating components of exemplary quick find engine 250. Quick find engine 250 can include two major functional components: data analysis module 400 for determining which tables and fields are searchable, and search module 430 for actually performing the quick find. In addition, quick find engine 250 can include various other components for interacting with various parts of a database reporting system.

FIG. 4A is a block diagram illustrating components of data analysis module 400 of quick find engine 250. Data analysis module 400 can include various software engines for determining what tables and data fields are searchable.

Static analytical engine 402 can be used to perform static analysis of tables and data fields. For example, static analytical engine 402 can access database 410 and examine table 412 to determine whether table 412 is sufficiently closely related to a base table to be searchable (e.g., by looking at the keys and foreign keys in the tables). Static analytical engine 402 can also determine whether table 412 is sufficiently closely related to a base table by examining queries in a database application and see if table 412 is at most one "join" away from the base table. Static analytical engine 402 can also determine which data field in table 412 is searchable by, for example, identifying the data fields in table 412 that is represented in layout 414, and identifying the data fields that have a searchable type (e.g., number, string, date, etc.).

Dynamic analytical engine 404 can be used to perform dynamic analysis of tables and data fields. For example, if the size of a table (measured by number of rows) grows too big, searching on the table may become impractical, especially when the table is not indexed, because creating an index of such a table can take a long time and can be achieved in a process independent of the search. Dynamic analytical engine 404 can access database 410 and examine table 412 to determine whether table 412 is too large for quick find, whether a data field is has low selectivity such that the data field should not be searched.

In some implementations, a developer can configure dynamic analytical engine 404 such that a warning is shown when a table grows too large or a field's selectivity has dropped too low. To give a user a consistent experience, dynamic analytical engine 404 can enable search on a field even when the field has a low selectivity. In such cases, dynamic analytical engine 404 can prompt the user with a warning at design time (e.g., when the user designates a field having a low selectivity as searchable), or at run time (e.g., when the user actually performs the quick find on the field), or both.

User input engine 406 can be used to receive user designated searchable fields. A user can designate field as searchable on layout 414, in a formatted view, through a script, or through an API. For example, UI components 408 can be used to receive user input and provide feedback to user actions.

FIG. 4B is a block diagram illustrating components of search module 430 of quick find engine 250. Search module 430 can include various software engines for performing the actual search.

Search term processor 432 can process search terms submitted by users. Search term processor 432 can normalize the search terms. Normalizing the search term can include processing the search term such that the search term complies with format of the particular query languages used (e.g., SQL). For example, normalization can include escaping special characters such as single quote, percent sign, etc. When the search term is a string, normalization can also include adding a wildcard (e.g., "%") to various parts of the search term. For example, search term processor 432 can add an implicit trailing wildcard to the end of the string by default. Thus, a search for "cat" can return "cat" and "catalog." In some implementations, search term processor 432 can also be configured such that the wildcard is added to the beginning of the string. In some implementations, search term processor 432 can perform spell check of user entered search terms and provide spelling suggestions if the user entered search term does not appear to be a valid term.

The database reporting system can use search term translation engine 440 to evaluate search terms. Search term translation engine 440 can use scripts 442 to process the search terms. Processing the search terms can include evaluating the search term in a context of each identified searchable data field and expanding the search term to match a field type of the data field. Evaluating the search term can include identifying a variable item in the search term using a script that includes a list of one or more variable items and a corresponding list of customizable substitution rules and substituting the variable item in the search term using a substitution rule that corresponds to the variable item.

In some implementations, search term translation engine 440 can process expressions in the search term. Expressions can be evaluated using an expression engine, or alternatively, using one or more user customizable scripts. When a search term includes expressions containing arithmetic operators (+, −, *, /, and mod), logical operators (and, or, not), and other math functions (e.g., sqrt, exp, sin), search term translation engine 440 can be configured to search based on the value of the expressions rather than the expressions themselves. In some implementations, search term translation engine 440 can be configured to evaluate values in reverse Polish notations (e.g., expressions "3, 5, +" can be evaluated to a value "8"). In some implementations, if no other operators are present, the search terms can be automatically treated as having "AND" relationships with each other.

In some implementations, search term translation engine 440 can evaluate the search term based on context. Evaluating the search term can include replacing the search term with a new value that is proper for the field being searched. For example, a search term "2/2000" can be expanded to an expression or a clause the searches for date "February 2000." Search terms "my sales record" can be expanded to "Bob Crow sales record," etc. Evaluating the search term can include two mutually non-exclusive parts: evaluating the search term based on a type of the field being searched, and evaluating the search term based on customized scripts.

Evaluating the search term based on field type can include converting the search term to the type of the field. In addition to a type conversion, the system can expand the search term to match a field type of the data field. A text string in a search term can remain a text string when the type of a data field being searched is alphabetical, and be converted to a value (when possible) when the type of a data field being searched is numerical. For example, search term "nineteen" can remain a text string or be converted into "19" when the field being searched is a numerical field. Similarly, numerical values in the search can be converted to various formats. For example, "2/2000" can be either a string "2/2000," a value "0.001," or a date "February 2000" depending on the field type.

In some implementations, search term translation engine 440 can support other operators that are specific to database searches. For example, the system can support a date range operator and a match phrase operator (quote and end-quote, " "). Furthermore, search term translation engine 440 can support user-defined evaluations. A user can define the meaning of an operator in scripts 442. User defined meaning of the operator can override a default meaning of an operator. For example, search term translation engine 440 can process an operator "!" whose default behavior is to find duplicate values. A user can redefine the operator to mean logical "NOT." The system can evaluate search term using the user's meaning.

Scripts 442 can be used to define the variables to be substituted, define evaluation rule for various operators, and rules for evaluating expressions in specific ways, etc. In short, scripts 442 can include any user-customizable processing of query terms.

Evaluating the search term based on customized scripts 442 can include substituting search term strings using various substitution rules. The system can be configured to allow manipulation of search terms using scripts 442. Scripts 442 can include a list of one or more variable items and a corresponding list of customizable substitution rules. The system can identify a variable item in the search term using scripts 442. When a component (e.g., a substring) of a search term matches a variable item, the system can substitute the variable item in the search term using a substitution rule that corresponds to the variable item. In some implementations, a variable can be identified by a prefix. For example, "$current_user sales" can be substituted into "Bob Hawk sales" if Bob Hawk is a current user and the name Bob Hawk is in the variable $current_user.

Search term translation engine 440 can interact with a user using user interface 444. A user can create or edit scripts 442 using the user interface 444. The user can also select a particular script from multiple scripts 442 to apply to the search terms entered using the user interface 444. In some implementations, an application programmer can create or edit scripts 442. In some implementations, the application programmer can allow an end user with certain privileges (or no privileges at all) to create or edit scripts 442.

The database reporting system can use query builder 450 to construct quick find queries 454. In some implementations, constructing quick find queries 454 can include analyzing existing queries 452 and adding more data selection criteria (e.g., using search terms 432 as extra requirements). In some implementations, data selection criteria expressed or implied in existing queries 452 can be superseded by a new set of data selection criteria that selects data in searchable data fields using processed search term.

The database reporting system can perform search on database 460 using quick find queries 454. Quick find queries 454 can retrieve a result set from multiple database tables 462 and 464 (e.g., a base table and a related table). The result set can be sent for formatting using other computer modules.

In some implementations, search module 430 can include other components. For example, search module 430 can include a quick find specific access privilege checking module, a Web interface for providing the interfaces in a browser, an API for communication with other application programs, and interfaces with other components of a database application program as described below with respect to FIG. 4C.

Figure 4C:
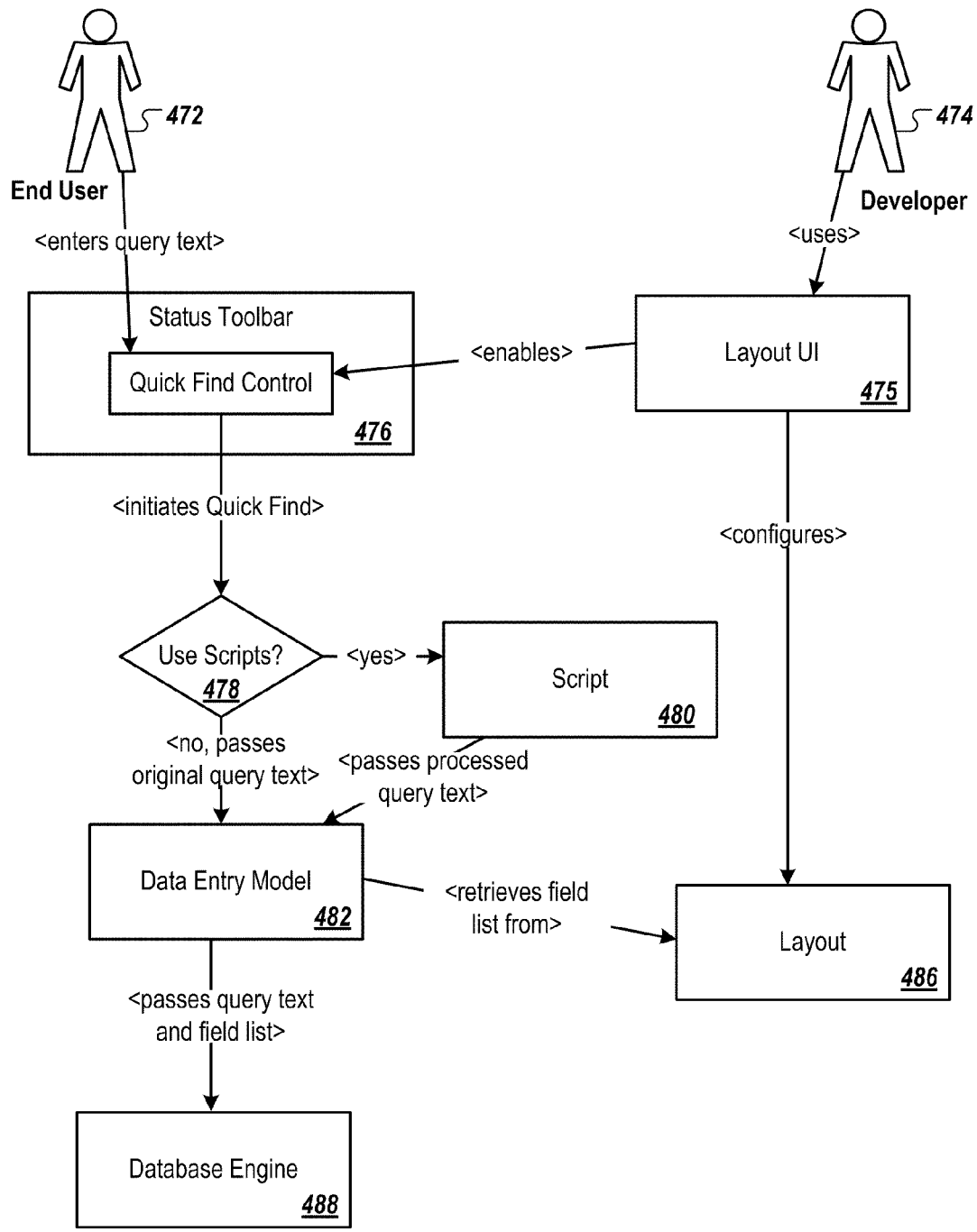
FIG. 4C is a component diagram of some exemplary implementations of quick find techniques.

FIG. 4C is a component diagram of some exemplary implementations of quick find techniques. Various components 475, 476, 480, 482, 486, and 488 of a database reporting system can interact with quick find engine 250 to perform search on various data fields. Quick find engine 250 can invoke various functions in these components and control quick find specific data flow among these components.

Users of a database reporting system can include a developer 474 and an end user 472. Developer 474 (e.g., an application programmer, a.k.a. a solution developer) can be a user who builds database application programs on a database reporting system. End user 472 can be a user who uses the database application programs built by developer 474. End user 472 and developer 474 can have distinct access privileged to various parts of the database reporting system.

Developer 474 can use layout user interface (layout UI) 475 to edit and configure layout 224, including enabling one or more data fields for quick find. If a data field is enabled for quick find, the data field can be searched using quick find queries. In some implementations, developer 474 can enable or disable layout 224 for quick find using a checkbox on a layout setup dialog user interface. In addition, developer 474 can enable or disable layout individual data fields 226 and 228 using a checkbox on a field properties panel. The field properties panel is a user interface that can be associated with each data field, which can be activated by a click on the data field. The field properties panel can include various sections (e.g., tabs) that can be used to define format or behavior of a data field. Developer 474 can select multiple data fields 226 and 228 and enable or disable them for quick find with one click.

Disabling layout 224 for quick find need not change the quick find settings of individual data fields. Instead, disabling layout 224 for quick find can ignore the individual field's settings until layout 224 is re-enabled for quick find. Disabling layout 224 for quick find can also disable quick find checkboxes on individual data fields until layout 224 is enabled for quick again.

In some implementations, certain data fields can be excluded from quick find searches on layout UI 475. For example, summary fields, container fields, and global fields can be excluded. A summary field can contain a calculated value, e.g., a sum or an average of other data fields. A container field can contain complex data types such as images, sounds, movies, objects, etc. A global field can be a field defined with a global storage option. The global field can contain a value that is used for all records in a file. The global field can have any field type except summary type. The value contained in the global field can be used as a fixed value in calculations or to declare variables in "if" or "loop" script steps. The global field can also contain data whose value rarely needs to be updated (e.g., a company logo). On layout UI 475, quick find checkboxes of excluded data fields can be unchecked and disabled (e.g., grayed out). If developer 474 changes a type of a data field that has already been enable for quick find into a summary type, container type, or global type, the quick find checkbox can remain checked. However, the checkbox can be disabled, and the data field can be excluded from quick find searches.

Quick find settings for data fields can be copied and pasted when developer 474 performs copy and paste operations on data fields in layout UI 475. A data field can occur more than once on layout 224. For example, developer 474 can copy data field 226 and paste the copied data field 226 to another section of layout 224. Enabling or disabling data field 226 for quick find can enable or disable quick find for all occurrences of data field 226 on layout 224.

Layout UI 475 can include a menu item on a menu to show which data fields are enabled for quick find. The menu item can work as a toggle. If developer 474 checks the menu item, all fields enabled for quick find in layout UI 475 can be displayed together with badges (e.g., icons that can indicate a quick find enabled status). For data fields enabled for quick find by default, a "fast" badge (e.g., a green star) can be shown. For data fields disabled by default but enabled for quick find manually, a "slow" badge (e.g., a yellow star) can be shown. If the menu item for enabling quick find is checked but quick find is disabled for application program 220 or layout 224, a "paused" quick find badge (e.g., a gray star) can be shown. Similarly, if an application programmer changes field type of a field enabled for quick find into a summary, container, or global field, the "paused" quick find badge can be shown with the field. A default state of the menu toggle can be "off." However, the latest used toggle setting can be preserved when developer closes and reopens a database application program.

When developer 474 creates a new layout (e.g., layout 224) using layout UI 475, the new layout can be enabled for quick find by default. Adding a new data field to the new layout can include automatically setting the new data field to a default quick find state of the data field. Setting default quick find states for data fields will be discussed in further detail below with respect to FIG. 5.

When developer 474 enables one or more data fields for quick find in layout UI 475, a status toolbar 476 that includes a quick find control can be displayed on a formatted view when the database reporting system runs the database application. The quick find control can include text area 242 and quick find button 246. End user 472 can enter search text in text area 240 of the quick find control. End user 472 can initiate quick find by clicking quick find button 246.

Upon initiating quick find, the database reporting system can interact with various components based on whether the system is configured to process search terms using scripts. The system can determine (478) whether to use scripts to customize quick find. In some implementations, the system can make the determination by checking whether a "customizing quick find" menu item is selected. The menu can have an exemplary title "Advanced Custom Functions" and an exemplary menu item "Quick Find."

If the custom menu is selected, the system can execute custom script 480 when quick find feature is initiated. Script 480 can perform various operations on the search terms. Script 480 can access the search terms using a Get(QuickFindText) function, which can return the search terms. The search terms can be added to a search history. An application programmer can invoke a "Quick Find" script step from script 480 to perform a search, as well as add specialized functions. Some example customized functions include:

Filtering out some search terms (e.g., "the," "to," "9," etc.) before performing the actual quick find;

Warning the user that too many search terms were entered and ask for confirmation before continuing;

Re-routing execution based on the search terms. For example, in a bug database, if the search term is a number (e.g., bug number, which is a key), the quick find can return a selection based on the key, whereas if the search term is a string, the quick find can perform search in various data fields;

Handling operators. For example, search for "invoice Microsoft 2007 . . . 2009" can be executed as a quick find script step for "invoice Microsoft" followed by constraining the resulting found set using a regular selection criteria for a data range; and Repurposing the quick find feature to perform other functions. For example, doing quick find for a calculation (e.g., "2+2") or a stock symbol (like "AAPL") can show a custom dialog displaying a calculation result or fetch a stock quote from the Internet.

After script 480 has run, or if the custom menu to execute is not set, the system can pass the search terms (either the original terms or terms processed by script 480) to data entry model 482. Data entry model 482 can retrieve a field list from layout 486 (which can be configured by application developer 474 through layout UI 475) that contain searchable data fields. Data entry model 482 can also include a query engine for building quick find queries.

In some implementations, the new query can contain refinements of existing query 222. The refinements can include both expansions of existing query 222 (e.g., by allowing additional tables and fields to be selected) and limitations of existing query 222 (e.g., by adding search terms to existing query 222). In some implementations where database 202 is a relational database and query 222 contain queries written in Structured Query Language (SQL), the refinements can include additional terms in a WHERE clause and a FROM clause. For example, the following example SQL code illustrates original query 222:

```
SELECT data_field_226, data_field_228
FROM table 204, table_206
WHERE (table_204.field_x = table_206.field_y) AND [condition C is
satisfied].
```

In some implementations, find engine 250 can create a quick find query based on the searchable database fields and the search term, regardless of the conditions specified in the original query. For example, when the search term is "john," quick find engine 250 can create the following quick find query:

```
SELECT data_field_226, data_field_228
FROM table_204, table_206
WHERE (table_204.field_x = table_206.field_y)
    AND (data_field_226 LIKE 'john%' OR
    data_field_228 LIKE 'john%').
```

The quick find queries can include query text and field list. The query text and field list can be passed to database engine 488 to be assembled into database query statements and submitted to a database to retrieve search results.

Figure 5A:
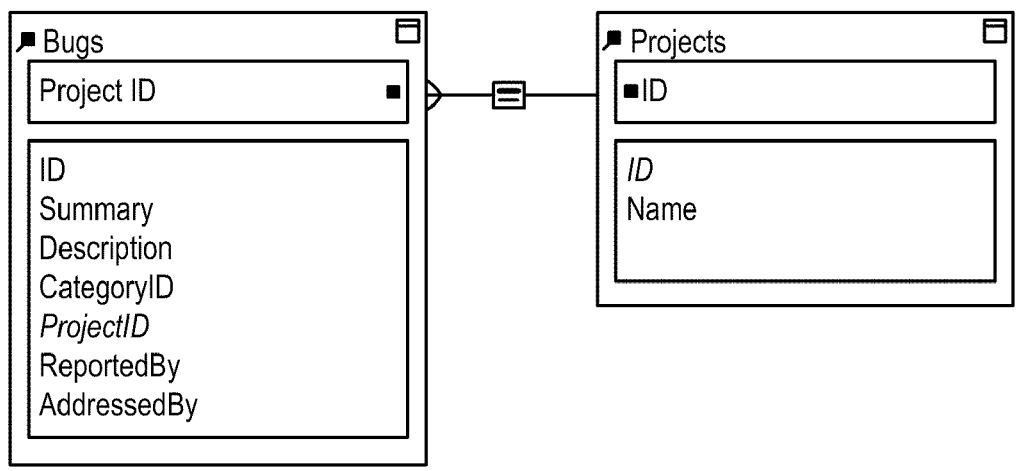
FIGS. 5A-5C illustrate exemplary related database tables used in some implementations of quick find process.
Figure 5B:
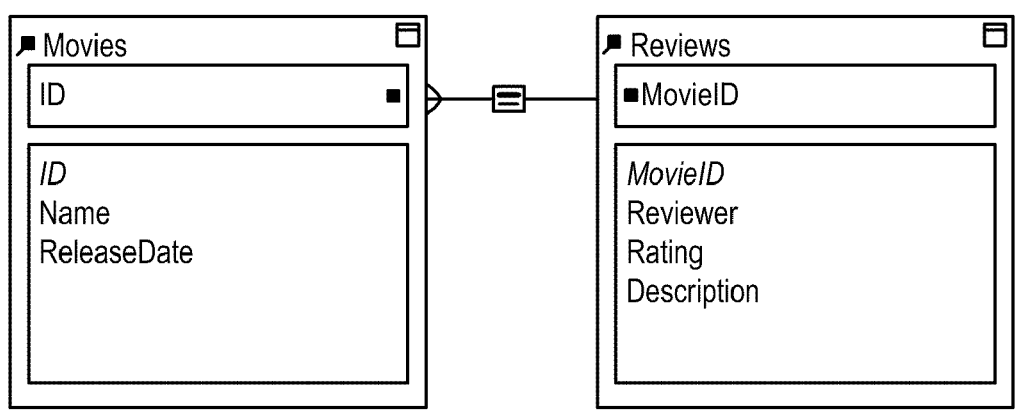
Figure 5C:
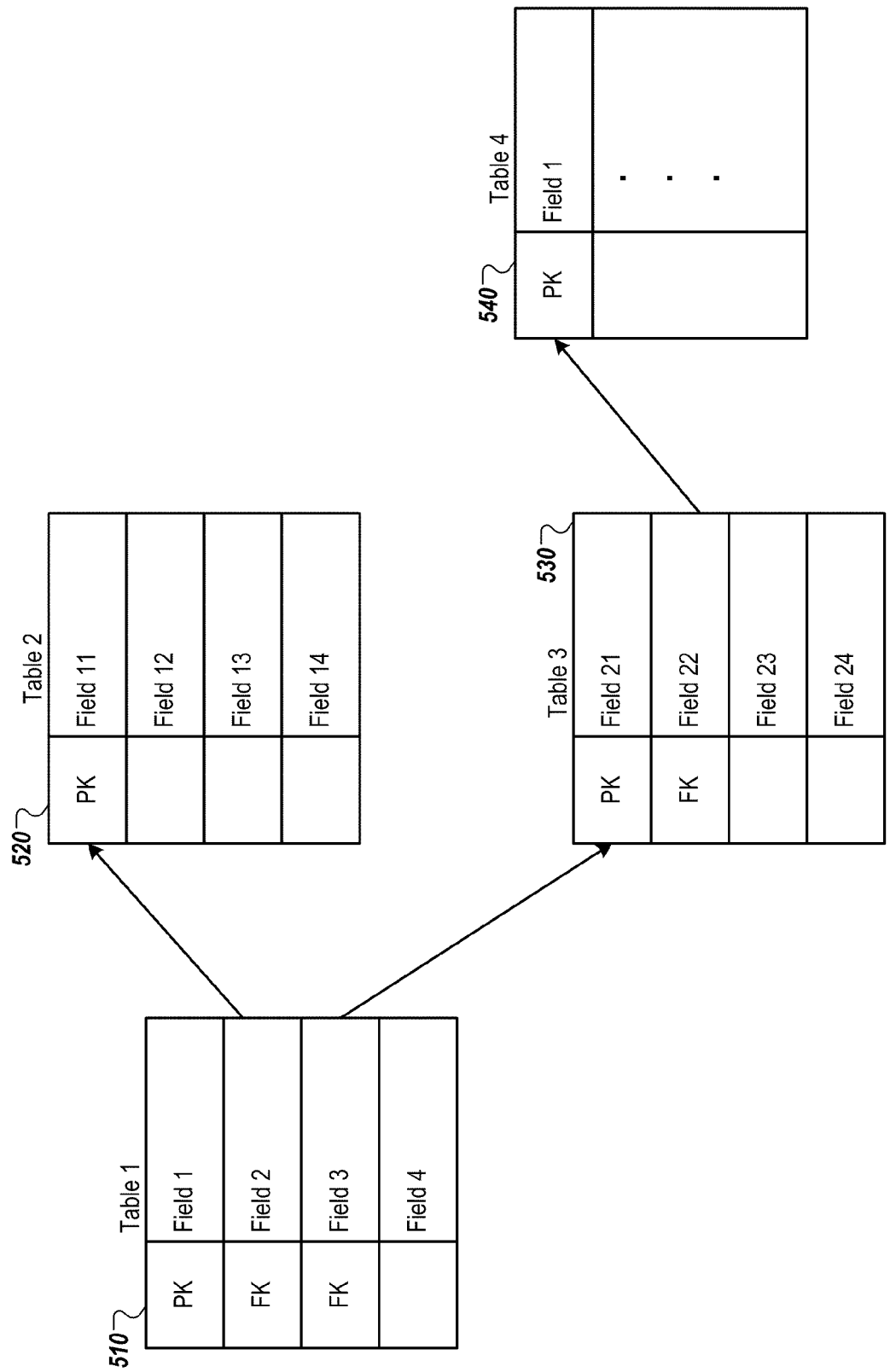

FIGS. 5A-5C illustrate exemplary related database tables that can be searched by a quick find process. A determination can be based on two factors: a distance between the related table to the base table, and a nature of the relationship.

The distance between the related table and the base table can be measured by a degree of separation. If a related table and a base table is one join away and the join is based on equality (e.g., the relationship is based on "Table_A.column_1=Table_B.column_2"), or contain foreign key of each other, the related table and base table are in a first degree of separation. In some implementations, a related table that has a first degree of separation can be designated as searchable.

The nature of the relationship between tables can be one-to-one, one-to-many, and many-to-many. A one-to-one relationship occurs when each row of either table A or table B is connected to, or maps to, or is related to one row of the other. A one-to-many relationship occurs when for each row of table A can correspond to many rows of table B (e.g., one table is related to many occurrences in another table). Table A is on the "one" side of the one-to-many relationship. A many-to-many relationship occurs when each row of table A can correspond to many rows of table B, and vice versa. In some implementations, a related table that is in a one-to-one relationship with the base table can be designated as searchable. A related table that is in a one-to-many relationship with the base table, and on the one side of the one-to-many relationship, can be designated as searchable.

FIG. 5A illustrates a one-to-many relationship between exemplary tables "Bugs" and "Projects" of a bug-tracking database. Base table "Bugs" and related table "Projects" are in a one-to-many relationship. Each row in the "Bugs" table can correspond to a distinct bug. The bug is associated with a specific software development project. Conversely, each software development project can have multiple bugs in the database. Therefore, the "Projects" table is on the "one" side of the one-to-many relationship. In some implementations, related table "Projects" can be automatically designated as searchable (e.g., by default). A user can override this designation.

FIG. 5B illustrates another one-to-many relationship exemplary tables "Movies" and "Reviews" in a movie review database. Base table "Movies" and related table "Reviews" are in a one-to-many relationship. Each row in the "Movies" table can correspond to multiple reviews. Conversely, each review can correspond to a single movie in the database. Therefore, the "Reviews" table is on the "many" side of the one-to-many relationship. In some implementations, related table "Reviews" can be manually designated as searchable (e.g., through a UI on a layout or on a formatted view).

FIG. 5C illustrates criteria for identifying a searchable table from related tables. In various implementations of quick find, various degrees of separation from a base table can be used as a threshold to filter related tables. Any table can be specified as a base table for a layout. For example, when the degree of separation is set to one, and table 520 is a base table of a layout, table 510 can be a searchable related table. If table 510 is a base table, tables 520 and 530 can be searchable related tables. If table 540 is a base table, table 530 can be a searchable related table.

Example System Architecture

Figure 6:
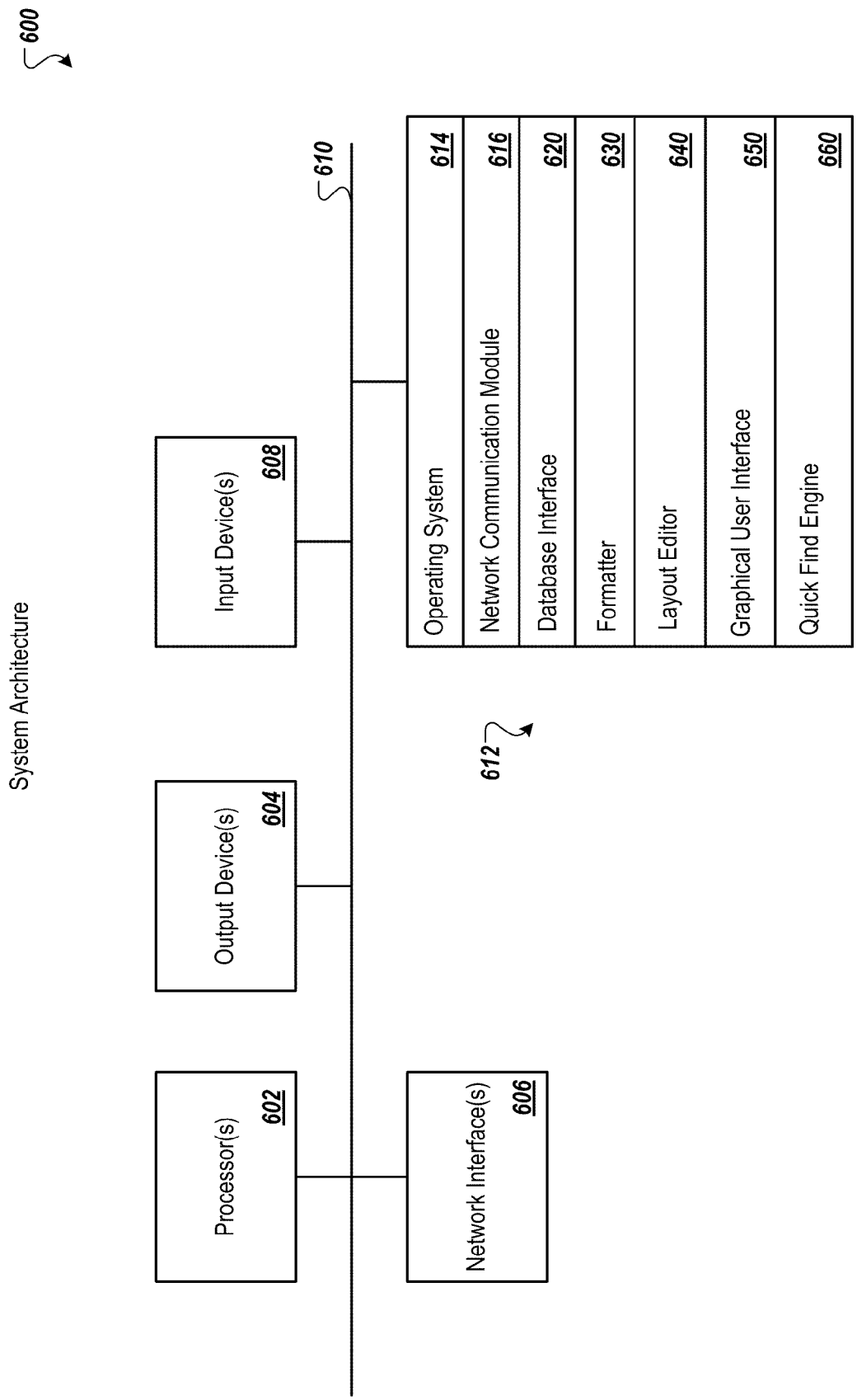
FIG. 6 is a block diagram of an exemplary system architecture for implementing the features and operations described in reference to FIGS. 1-5.

FIG. 6 is a block diagram of an exemplary system architecture 600 for implementing the features and operations described in reference to FIGS. 1-5. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., Mac OS® server, Windows® NT server), network communication module 616, database interface 620, formatter 630, direct database access module 640, graphical user interface 650, and quick find engine 660, as described in reference to FIGS. 1-5. Operating system 614 can be multi-user, multiprocessing, multitasking, multithreading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.). Direct database module 640 can include one or more functional components for retrieving a data record from a database using an internal identifier. Quick find engine 660 can include data analysis module 400, search module 430, as well as various other components for interacting with various parts of a database reporting system.

Architecture 600 can be included in any device capable of hosting a database application program. Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. Accordingly, other implementations are within the scope of the following claims.

For example, the term "database" can refer to any structured collection of data that is stored on a computer system, including, for example, a relational database, an object-oriented database, a file system, an indexed collection of documents, or any structured data. The term "query" can refer to any request for information retrieval, including, for example, a SQL query, a search request, or a request into a file system. The term "database reporting system" can refer to any system that accepts queries, identifies information using the queries, and presents the identified information to a user in a formatted view. A database reporting system can include, for example, a Relational Database Management System (RDBMS), a desktop file indexing system, or an Internet search engine.

What is claimed is:

1. A computer-implemented method comprising:
   providing for display a user interface for accessing a database, the user interface including one or more data fields, wherein the user interface is defined by a layout corresponding to a base table in the database, the layout including formatting information of each data field;
   identifying, based on a degree of relationship between the base table and the one or more data fields, one or more searchable data fields from the base table and the one or more data fields;
   determining, based on the degree of relationship, a search speed for each identified searchable data field, the search speed being an estimated speed of a search operation targeting the corresponding searchable data field; and
   providing a badge for display in association with each identified searchable data field, the badge including a user interface item indicative of the search speed associated with the corresponding searchable data field,
   wherein the method is performed by one or more computers.

2. The method of claim 1, wherein identifying the one or more searchable data fields comprises analyzing a static relationship between the base table and a related table based on a schema of the database and the one or more existing database queries.

3. The method of claim 2, wherein analyzing the static relationship comprises:
   locating a table based on a number of joins from the base table and a type of each join as specified in the one or more existing database queries;
   selecting a located table based on a direction of the joins; and
   designating the selected table as the related table.

4. The method of claim 1, comprising analyzing a dynamic relationship between the base table and a related table using characteristics of the tables, the characteristics including table size and field selectivity.

5. The method of claim 1, comprising providing for display a user interface for manually designating a data field to be searchable or unsearchable.

6. The method of claim 5,
   wherein the badge for each searchable data field has at least one of a "fast" designation or a "slow" designation, each designation being represented by a distinct color, shape, or label of the badge.

7. The method of claim 1, wherein identifying the one or more searchable data fields comprises:
   designating one or more groups of searchable fields, each group being accessible when a specified access privilege is present; and
   determining that a data field is searchable based on a group to which the data field belongs and a current access privilege.

8. The method of claim 1, comprising performing a search in response to a search request, the search request comprising a search term, wherein performing the search comprises:
   evaluating the search term in a context of each identified searchable data field;
   expanding the search term to match a field type of the identified searchable data field; and
   performing the search using the expanded search term.

9. The method of claim 8, wherein evaluating the search term comprises:
   identifying a variable item in the search term using a script that includes a list of one or more variable items and a corresponding list of customizable substitution rules; and
   substituting the variable item in the search term using a substitution rule that corresponds to the variable item.

10. A computer program product encoded on a non-transitory computer storage medium, operable to cause data processing apparatus to perform operations comprising:
    providing for display a user interface for accessing a database the user interface including one or more data fields, wherein the user interface is defined by a layout corresponding to a base table in the database, the layout including formatting information of each data field;
    identifying, based on a degree of relationship between the base table and the one or more data fields, one or more searchable data fields from the base table and the one or more data fields;
    determining, based on the degree of relationship, a search speed for each identified searchable data field, the search speed being an estimated speed of a search operation targeting the corresponding searchable data field; and
    providing a badge for display in association with each identified searchable data field, the badge including a user interface item indicative of the search speed associated with the corresponding searchable data field.

11. The product of claim 10, wherein identifying the one or more searchable data fields comprises analyzing a static relationship between the base table and a related table based on a schema of the database and the one or more existing database queries.

12. The product of claim 11, wherein analyzing the static relationship comprises:
    locating a table based on a number of joins from the base table and a type of each join as specified in the one or more existing database queries;
    selecting a located table based on a direction of the joins; and
    designating the selected table as the related table.

13. The product of claim 10, the operations comprising analyzing a dynamic relationship between the base table and a related table using characteristics of the tables, the characteristics including table size and field selectivity.

14. The product of claim 10, the operations comprising providing for display a user interface for manually designating a data field to be searchable or unsearchable.

15. The product of claim 14, wherein the
    badge has at least one of a "fast" designation or a "slow" designation, each designation being represented by a distinct color, shape, or label of the badge.

16. The product of claim 10, wherein identifying the one or more searchable data fields comprises:
    designating one or more groups of searchable fields, each group being accessible when a specified access privilege is present; and
    determining that a data field is searchable based on a group to which the data field belongs and a current access privilege.

17. The product of claim 10, the operations comprising performing a search in response to a search request, the search request comprising a search term, wherein performing the search comprises:
    evaluating the search term in a context of each identified searchable data field;
    expanding the search term to match a field type of the data field; and
    performing the search using the expanded search term.

18. The product of claim 17, wherein evaluating the search term comprises:
    identifying a variable item in the search term using a script that includes a list of one or more variable items and a corresponding list of customizable substitution rules; and
    substituting the variable item in the search term using a substitution rule that corresponds to the variable item.

19. A system comprising:
    one or more computers operable to perform operations comprising:
    providing for display a user interface for accessing a database, the user interface including one or more data fields, wherein the user interface is defined by a layout corresponding to a base table in the database, the layout including formatting information of each data field;
    identifying, based on a degree of relationship between the base table and the one or more data fields, one or more searchable data fields from the base table and the one or more data fields;
    determining, based on the degree of relationship, a search speed for each identified searchable data field, the search speed being an estimated speed of a search operation targeting the corresponding searchable data field; and providing a badge for display in association with each identified searchable data field, the badge including a user interface item indicative of the search speed associated with the corresponding searchable data field.

20. The system of claim 19, wherein identifying the one or more searchable data fields comprises analyzing a static relationship between the base table and a related table based on a schema of the database.

21. The system of claim 20, wherein analyzing the static relationship comprises:
locating a table based on a number of joins from the base table and a type of each join as specified in the one or more existing database queries;
selecting a located table based on a direction of the joins; and
designating the selected table as the related table.

22. The system of claim 19, wherein the operations comprising analyzing a dynamic relationship between the base table and a related table using characteristics of the tables, the characteristics including table size and field selectivity.

23. The system of claim 19, the operations comprising providing for display a user interface for manually designating a data field to be searchable or unsearchable.

24. The system of claim 23, wherein the badge has at least one of a "fast" designation or a "slow" designation, each designation being represented by a distinct color, shape, or label of the badge.

25. The system of claim 19, wherein identifying the one or more searchable data fields comprises:
designating one or more groups of searchable fields, each group being accessible when a specified access privilege is present; and
determining that a data field is searchable based on a group to which the data field belongs and a current access privilege.

26. The system of claim 19, the operations comprising performing a search in response to a search request, the search request comprising a search term, wherein performing the search comprises:
evaluating the search term in a context of each identified searchable data field;
expanding the search term to match a field type of the data field; and
performing the search using the expanded search term.

27. The system of claim 26, wherein evaluating the search term comprises:
identifying a variable item in the search term using a script that includes a list of one or more variable items and a corresponding list of customizable substitution rules; and
substituting the variable item in the search term using a substitution rule that corresponds to the variable item.

\* \* \* \* \*